United States Patent
Chaignon et al.

(10) Patent No.: US 6,790,906 B2
(45) Date of Patent: Sep. 14, 2004

(54) FIRE-RETARDANT POLYURETHANE SYSTEMS

(75) Inventors: Jöel Chaignon, Ecos (FR); Francois Adeleu, Gournay en Bray (FR); Jean-Marc Leleu, Gourney en Bray (FR); Peter Merz, Wollerau (CH); Ukiwo Obasi Onuoha, Zürich (CH)

(73) Assignee: Sika Schweiz AG, Zurich (CH)

( * ) Notice: Subject to any disclaimer, the term of this patent is extended or adjusted under 35 U.S.C. 154(b) by 0 days.

(21) Appl. No.: 10/324,054

(22) Filed: Dec. 20, 2002

(65) Prior Publication Data

US 2003/0220407 A1 Nov. 27, 2003

(Under 37 CFR 1.47)

Related U.S. Application Data

(63) Continuation of application No. 08/799,908, filed on Feb. 13, 1997, now abandoned.

(30) Foreign Application Priority Data

Feb. 14, 1996 (CH) ................................................ 385/96

(51) Int. Cl.$^7$ .............................................. C08G 18/10
(52) U.S. Cl. ........................ 524/706; 524/710; 524/786
(58) Field of Search ................................ 524/710, 706, 524/786

(56) References Cited

U.S. PATENT DOCUMENTS

| 4,876,291 A | 10/1989 | Dallavia et al. |
| 5,196,455 A | 3/1993 | Bryant |

FOREIGN PATENT DOCUMENTS

| EP | 0200801 A1 | 11/1986 |
| FR | 1356972 | 1/1963 |
| FR | 1496648 | 10/1966 |
| FR | 1505924 | 12/1966 |
| WO | WO 94/06886 A1 | 3/1994 |

*Primary Examiner*—Rachel Gorr
(74) *Attorney, Agent, or Firm*—Burns, Doane, Swecker & Mathis, L.L.P.

(57) ABSTRACT

A storage-stable moisture-curing one-component fire-retardant polyurethane system, useful as adhesive, sealant or coating material, comprising at least one hydrated mineral having a water-content of less than 0.1% and being treated with a moisture-reactive compound, and at least one binder on isocyanate basis. Such PU-systems preferably further comprise at least one phosphorus-containing compound, most preferably a phosphorus-containing plasticizer, which is preferably halogen-free. The binder on isocyanate basis has preferably an isocyanate content in the range of from 0.01 to 10% by weight referred to the total weight of the system.

17 Claims, No Drawings

FIRE-RETARDANT POLYURETHANE SYSTEMS

This application is a continuation of application Ser. No. 08/799,908, filed Feb. 13, 1997, now abandoned.

BACKGROUND OF THE INVENTION

This application claims the priority of Swiss application No.385/96, filed on Feb. 14, 1996, the disclosure of which is incorporated herein by reference in its entirety.

The present invention relates to one-component polyurethane (PU) systems, particularly fire-retardant (FR) systems. These systems are preferably halogen-free. The systems can be used as adhesive, sealant or coating materials.

The use of aluminium trihydroxy hydrate (ATH) alone or in combination with a phosphorus or halogen containing compound is known in two-component polyurethane systems. Such a system is described, e.g., in U.S. Pat. No. 4,876,291. That document describes a method for forming a fire-retardant composition that is added to the polyol component shortly before mixing with the isocyanate compound in order to achieve superior physical foam properties. This fire-retardant composition contains a hydrated filler, such as ATH, which is pretreated with 0.25 to 5% polyfunctional isocyanate relative to the amount of ATH, resulting in a moisture content of about 0.2%.

Hydrated minerals, such as aluminium trihydroxy hydrate (ATH) impart both flame and smoke retardancy by evolving non-toxic gases, such as water, to dilute combustion products and to promote char formation.

However, it has been found that a pretreated ATH, such as that described in U.S. Pat. No. 4,876,291, is not suitable for one-component adhesive formulations held in a sealed vessel. There is a lack of storage stability leading to a fast increase in viscosity. As a result, there is a substantial loss of handling properties in a relatively short period of time.

One component polyurethane systems comprising pre-dried additives are known in the art. WO 94/06886, for example, discloses a vitreous filler that is predried using an isocyanate having a functionality of at least 2. FR-A-1,505,924 and FR-A-1,356,972 both describe PU-systems comprising predried pigments. The pre-drying is performed using water-reactive compounds.

The use of aluminium oxide as a drying agent for PU-systems (produced by incomplete dewatering of aluminium oxide trihydrate (aluminium hydroxide) to a water content of 0.5 to 0.05 mole per mole aluminium oxide), is described in FR-1,496,648.

An optionally high pigmented mass (5 to 25% pigment) is described in EP 0 200 801. In addition to the pigment, the mass comprises about 1 to 3% by weight of a moisture binding agent.

Since two component systems are not as easy to use as one component systems, it is one object of the invention to provide a one component, fire-retardant (FR) polyurethane (PU) system, which, most preferably, is halogen-free. It is a further object of the invention to provide a specific manufacturing method to achieve storage-stable fire-retardant adhesives.

Another object of the invention is to provide particulate fillers for imparting flame retardation, which are suitable for use in one-component PU systems.

SUMMARY OF THE INVENTION

Accordingly, it is a general object of the present invention to provide isocyanate and/or silane terminated polyurethane systems that are storage-stable, moisture-curing and fire-retardant.

It was surprisingly found to be possible to formulate a flame-retardant and storage-stable, moisture-reactive PU-system containing a considerable amount of hydrated minerals filler material, such as aluminium trihydroxy hydrate (ATH), even in large amounts, e.g. more than 35%, if the hydrated minerals are treated by a particular method which is also part of the present invention.

The desired storage-stability can be achieved by a specific production method for the hydrated mineral wherein a mineral's surface activity is reduced and neutralized, thus preventing undesired increases in viscosity upon storage (which makes application impossible).

The surface activity of hydrated minerals depends on the groups capable of reacting with NCO-groups of the binder.

It is a further object of the present invention to provide an ecological system that moisture-cures to a flame and smoke retardant elastomer, particularly such a system for use as an adhesive, sealant or coating material.

This was possible through the use of a specially treated hydrated mineral, preferably with a halogen-free, phosphorus-containing substance, preferably a phosphorus-containing plasticizer. Such a phosphorus-containing compound improves the fire-retardant performance of the hydrated mineral, preferably ATH, in an unexpected manner. The phosphorus-containing material may be present in the formulation in a specific ratio relative to the binder. If the phosphorus-containing compound is a phosphorus-containing plasticizer, e.g., diphenylcresylphosphate (DPK), then the ratio of phosphorus-containing plasticizer to binder can be in a range of 0.25 to 5, preferably in a ratio of 0.7 to 1.5, and most preferably is about 1.

DETAILED DESCRIPTION OF THE PREFERRED EMBODIMENTS

The fire-retardant and storage-stable moisture-reactive PU-systems of the invention contain a considerable amount of hydrated mineral filler material(s) such as aluminium trihydroxy hydrate (ATH), and can be prepared according to the method described below. The thus treated ATH may be present even in large amounts, e.g., more than 35%, without adversely influencing the storage-stability of the system.

In order to enhance the flame and smoke retardancy it is preferred to use a specially treated hydrated mineral in combination with a phosphorus-containing plasticizer. The phosphorus containing material preferably is halogen-free. It improves the fire retardant performance of the hydrated mineral in an unexpected manner. If the phosphorus-containing compound is a phosphorus-containing plasticizer, e.g., diphenylcresylphosphate (DPK), then the weight ratio of phosphorus containing plasticizer to binder can be in a range of 0.25 to 5, preferably in a ratio of 0.7 to 1.5, and most preferably about 1 to 1.

The fire-retardant PU-system also preferably contains a latent hardener, which can be present in amounts of up to 10% by-weight, preferably in an amount of from 1 to 3% by weight based on the weight of the total system.

Additionally, the inventive system may contain other plasticizers, other fillers and other additives. Examples of additives include adhesion promoters, catalysts, etc.

The inventive moisture-reactive halogen-free fire-retardant adhesive, coating or sealing material preferably contains a mixture of:

a) 10 to 60% of at least one hydrated mineral having a water-content of less than 0.1% being further treated with a moisture-reactive compound, b) 10 to 50% of at least one phosphorus-containing plasticizer, c) 10 to 40% of at least one binder on isocyanate basis, d) optionally, at least one latent hardener in such amounts that the reactive groups of the hardener are present in an amount of 10 to 100% of the isocyanate-groups of the prepolymer, and e) optionally, those other components known in the art such as adhesion promoters, catalyst, fillers, other plasticizers, etc., but which do not fall within one of the above mentioned groups a) to d).

The isocyanate content (NCO) referred to the total weight of the adhesive, sealant or coating material usually is in the range of from 0.01 to 10% by weight, preferably below 1% by weight.

Examples of components which fall into aforementioned category e) include:

plasticizers selected from phthalates, such as dibutyl-, dioctyl-, dicyclohexyl-, diisooctyl-, diisodecyl-, dibenzyl-, or butylbenzylphthalate; epoxy-containing plasticizers, toluene-sulfonamides, paraffines, adipic esters, castor oils, etc.;

fillers selected from silicic acid derivatives, gypsum, talcum, active charcoal, metal powder, chalk, kaolinite, carbon black, etc.;

auxiliary agents or additives selected from i) latent hardeners, such as enamines, oxazolidines, aldimines and ketimines, possibly in the presence of an acid stabilizer or a latent acid stabilizer, e.g., an anhydride of a dicarboxylic acid, ii) adhesion promoters, particularly silane-containing compounds, which may additionally contain at least one reactive group, such as epoxy-, isocyanate-, amine groups or double bonds, iii) dyes or pigments, iv) polyurethane catalysts, such as lead and/or tin compounds, optionally combined with other polyurethane catalysts, especially with tertiary amine-containing catalysts, v) UV-absorbing agents or stabilizers, such as phenolic antioxydants, vi) surface active additives, such as emulsifying agents, vii) other flame retardants, such as phosphates with aryl groups or with up to 8 C-atoms in the alkyl group, e.g., diphenylcresylphosphate, tricresylphosphate, triethylphosphate, trioctylphosphate, etc.; dimethyl-methylphosphonate, and viii) fungistatic-active and/or bacteriostatic-active substances.

Preferred binders are isocyanate and/or silane terminated polyurethane prepolymers, particularly those formed of the following components:

a) aromatic diisocyanates, such as, e.g., 4,4'-diphenyl-methane-diisocyanate, 2,4-toluene-diisocyanate, naphthylene-1,5-diisocyanate, 1,3- and 1,4-phenylene-diisocyanate, and/or b) aliphatic or cycloaliphatic diisocyanates, such as hexamethylene-diisocyanate, 1,12-dodecane-diisocyanate, cyclobutane-1,3-diisocyanate, cyclohexane-1,3-diisocyanate, cyclohexane-1,4-diisocyanate, 1-isocyanato-3,3,5-trimethyl-3-isocyanatomethylcyclohexane (isophorone diisocyanate), 2,4- and 2,6-hexahydrotoluene-diisocyanate, hexahydro-1,3-phenyl-diisocyanate and hexahydro-1,4-phenyl-diisocyanate, perhydro-2,4'-diphenylmethane-diisocyanate and perhydro-4,4'-diphenylmethane-diisocyanate, and c) polyols having a molecular weight in the range of from 400 to 10,000, preferably in the range of from 1000 to 5000, such as the polyols of e.g., linear or branched polybutadienes, polycarbonates, polycaprolactones, polycaprolactams, polyethers (e.g., polyethylene oxides, polypropylene oxides, polybutylene oxides, polystyrene oxides, polyepichlorohydrines, and polytetrahydrofuranes), polyesters, e.g., any condensation products of:

multivalent alcohols (e.g. ethylene-glycol, propylene-glycol-1,2 and -1,3, butylene-glycol-1,4 and -2,3, hexanediol-1,6, octanediol-1,8, glycerin, trimethylolpropane, pentaerythrite, chinite, mannite and sorbite, methylglycoside, diethylene glycol, polyethylene glycols, dipropylene glycol, and polypropylene glycols) with multivalent carboxylic acids and/or carboxylic acid anhydrides and/or carboxylic esters, (e.g. succinic acid, adipic acid, octanedioic acid, azelaic acid, sebacic acid, phthalic acid, isophthalic acid, trimellitic acid phthalic acid anhydride, tetrahydrophthalic acid anhydride, tetrachlorophthalic acid anhydride, glutaric acid anhydride, maleic acid anhydride, fumaric acid, terephthalic acid-dimethylester and terephthalic acid-bis-glycol-ester, each having terminal, primary and/or secondary OH-groups, such as e.g. ethylene-glycols, bis-hexanediol-1,6, propylene glycol, bis-hexapropylene glycol, diethyleneglycol, and bis-hexaethylene-glycols).

A more preferred composition comprises a mixture of:

a) 35 to 45% of at least one hydrated mineral having a water-content of less than 0.1% and being further treated with the moisture-reactive compound, b) 20 to 30% of at least one phosphorus containing plasticizer, c) 20 to 30% of at least one binder on isocyanate basis, and d) optionally, at least one latent hardener in such amounts that the reactive groups of the hardener are present in an amount of 40 to 90%, most preferred of 50 to 80% of the isocyanate-groups of the prepolymer.

A preferred hydrated mineral is aluminium trihydroxy hydrate (ATH).

Preferred phosphorus containing plasticizers are ones that are halogen-free such as e.g., diphenyl cresyl phosphate (DPK), and a preferred binder on isocyanate basis has an isocyanate content (NCO) relative to the total weight of the preferred composition in the range from 0.01 to 10% by weight, preferably below 1% by weight.

The PU-systems of the invention are preferably produced by a particular process, itself being a part of the invention. The process comprises preparing the systems according to the invention under water-free conditions and using dewatered hydrated minerals, particularly ATH. The dewatered hydrated minerals are treated with moisture-reactive compounds. Thus, in the PU-system possibly also reaction products of the moisture-reactive compounds with water are present.

An effective drying of the hydrated mineral is carried out under vacuum and at a temperature suitable for partial dewatering of the hydrated mineral to a water-content of less than 0.1% (but without causing decomposition of the hydrated mineral). For ATH, the temperature can be above 120° C., but well below 200° C.

A water-content of the hydrated mineral of more than 0.1% leads to an insufficient storage stability and greasy consistency of the PU-system. Furthermore, if during the pre-drying of the hydrated mineral the water-content is not reduced to lower than 0.1%, excess moisture-reactive compounds is required. This may lead to a polyurethane elastomer with inferior polymer end-properties.

Any moisture-reactive compound which has at least one moisture-reactive group and which does not adversely affect the PU-system, can be applied to the predried hydrated mineral in the amounts needed to provide good storage-stability of a ATH-containing PU-system. Such compounds are, e.g., monomers having isocyanate-groups, or polyfunctional isocyanates, preferably mono-isocyanates, anhydrides, silanes, titanates. A preferred moisture-reactive compound is paratoluene sulfonyl isocyanate (PTSI).

Although it is possible to further dry the hydrated mineral to much less than 0.1% by, e.g., drying in a drying chamber with a chemical absorbent such as diphosphorus pentoxide, it is more preferred that a specific amount of moisture-reactive component is incorporated into the PU-system together with the hydrated mineral, that was predried to a water content of at most about 0.1%. Such a compound further contributes to a lower water-content of the whole formulation. Surprisingly, it was found not to be necessary to incorporate moisture-reactive groups into the system in an amount corresponding to the water remaining in the predried hydrated mineral. For most applications about 50–90 mole %, preferably about 65–75 mole %, are sufficient.

A preferred one component PU-system providing good storage stability and homogeneous properties (e.g., no agglomerations and lumps) is achieved when dewatered ATH is dispersed in portions under water-free conditions to a premix consisting of binder and fire retardant plasticizer with the binder having an isocyanate content of preferably less than 1%. It is then treated with a moisture-reactive component. Finally, the additives and the catalyst, e.g., an organo tin catalyst, are added.

In case a latent hardener is used for bubble-free moisture-curing of the PU-system, it is believed the best storage stability is achieved when dewatered ATH (predried) is dispersed in the fire-retardant plasticizer and then treated with the moisture-reactive component, e.g., polyfunctional isocyanate-containing compounds, at elevated temperatures, prior to the addition of the binder, latent curing agent, additives and catalyst.

The fire-retardant adhesive of the invention may be used for bonding and/or sealing of one or more materials, of the same or different origin, to an assembly. It is very well suited for the use in many applications in the construction area, as well as in other industries such as vehicle production, marine, etc. The fire-retardant adhesive of the invention may be used to bond or seal, e.g., the following:

construction materials, especially stones, concrete, mortar, road pavings;

metal which may be varnished, metallized or otherwise coated and/or pretreated, such as, e.g., bodies of vehicles;

metal alloys which may be varnished, metallized or otherwise coated and/or pretreated, such as, e.g., bodies of vehicles;

glass, especially glass plates for use in automotive vehicles, composite glass plates, and front walls of glass;

plastics, such as, e.g., PU-elastomers, polyesters, acrylonitril-butadiene-styrene-copolymers (ABS), polyamides, polyvinylacetate, polyvinylchloride, etc.; and any wood.

The following examples are solely intended to further illustrate the invention. They are not intended to in any way limit the scope of the invention.

EXAMPLES

Materials Used in the Examples

| | |
|---|---|
| MDI (methylene-4,4'-diphenyl diisocyanate): | Bayer, GER |
| TDI (tolylene diisocyanate): | Bayer, GER |
| Desmodur Z 4370 (trimerized IPDI): | Bayer, GER |
| IPDI (isophorone diisocyanate): | Bayer, GER |
| PTSI (para-toluene-sulfonyl isocyanate): | Rahn AG, CH |
| Polyoxyalkylene ether polyol: | Bayer/Dow, GER |
| Triethylene dimine: | Fluka, CH |
| DPK (diphenylcresyl phosphate/Disflamoll DPK): | BASF, GER |
| Salicylic acid: | Fluka, CH |
| DBTDL (dibutyl-tin dilaurate catalyst): | Air Products, GER |
| latent hardener BJ: (dialdimine derived from benzaldehyde and (polyoxypropylene diamine) | * |

*Preparation according to EP 0 469 751 A1, Temp. 110° C., but without any catalyst.

The ATH (aluminium trihydroxy hydrate) used as the starting material in the examples had an average particle size of 3.5 μm and a water content >0.3%. Such a product is, e.g., available as ATH SB 632 from Solem, France.

Preparation 1: TDI-Prepolymer

The TDI-prepolymer was prepared by reacting a polyoxypropylene ether polyol of an average molecular weight of 4000 and a hydroxyl number of 40 with toluene-diisocyanate (TDI).

2000 g of the polyol with a water-content of 0.03% by weight was charged into a flask with 198 g of TDI. The prepolymer synthesis reaction was catalized with 0.01% triethylene diamine and allowed to react under nitrogen purge while stirring at 80° C. for approximately 3 hours.

The reaction was completed after obtaining a final and constant isocyanate-content of 1.5% by weight. The prepolymer was allowed to cool down to a temperature of 60° C. and filled into air-tight cans for use in the formulations shown below.

Final prepolymer isocyanate-content: 1.5%

Viscosity after 24 hours at 23° C.: 15 Pas.

Preparation 2: MDI-Prepolymer

The same procedure used for preparing the TDI-prepolymer was employed here except that for the TDI used in Preparation 1, 324.98 g of methylene-diphenyl-diisocyanate (MDI) was used.

The mixture was allowed to react without catalysis at 90° C. for 3 hours resulting in a final and constant isocyanate-content of 2.0%. The temperature was allowed to cool down to 60° C. and the prepolymer was filled in air-tight cans for use in the formulations shown below.

Final prepolymer isocyanate-content: 2%

Viscosity after 24 hours at 23° C.: 20 Pa.s.

Example 1

(Fire-Retardant Performance of a Halogen-Free Adhesive)

The fire-retardant test "UL94" was used to rate the fire-retardant performance where the adhesive specimen is exposed directly to the flame.

ATH (without dewatering treatment of invention) was introduced to a premix of binder and DPK. Then 0.05 parts by weight (pbw) catalyst (DBTDL) was mixed into the PU-mass.

| Components | test 1 | test 2 |
|---|---|---|
| binder[1] | 26 pbw | 26 pbw |
| Disflamoll DPK | 23 pbw | 26 pbw |
| ATH (SB 632) | 35 pbw | 42 pbw |
| ratio DPK/binder | 0.83 | 1 |
| NFP 92501 M2 | bad | good | pbw= parts by weight
NFP 92501= radiation test

1) Binder=10 pbw TDI-Prepolymer and 16 pbw MDI-Prepolymer (for preparation of the isocyanate-prepolymer see above)

The investigation shows that the best fire-retardant performance is achieved when the ratio of the fire-retardant plasticizer, DPK, to binder is near one and the ATH content is more than 40%.

The adhesive of the invention exhibits improved fire-retardant performance on an ecologically optimized polyurethane material:

Classification M2 according to radiation test NFP 92501
Classification V-O according to inflammation test UL 94
Classification F2 according to smoke density flaming test NFX 10702 and NFX 70100.

Example 2

This example demonstrates the influence of drying of ATH and the use of an isocyanate compound as a treating agent on the storage stability of moisture-reactive PU-system without latent hardener.

ATH was introduced to a premix (binder and Disflamoll DPK) being pretreated with PTSI and/or Desmodur Z 4370. Then 0.05 pbw catalyst (DBTDL) was mixed into the PU-mass.

1) ATH SB 632 (Not Dried): Moisture-Content>0.3%

| Components | amounts | test 3 | test 4 | test 5 | test 6 |
|---|---|---|---|---|---|
| ATH (not dried) | 40 | x | x | x | x |
| binder[1] | 26 | x | x | x | x |
| Disflamoll DPK | 26 | x | x | x | x |
| PTSI | 0.6 |  | x | x | x |
| Desmodur Z 4370[5] | 1 |  |  | x | x |
| viscosity (mPa.s) |  |  |  |  |  |
| after production |  | 127 | 119 | 121 | 96 |
| after 7 d/20° C. |  | cured | cured | cured | cured |
| after 14 d/20° C. |  | cured | cured | cured | cured |
| after 28 d/20° C. |  | cured | cured | cured | cured |

2) ATH SB 632 (Dried): Moisture-Content<0.1%

| Components | amounts | test 7 | test 8 | test 9 |
|---|---|---|---|---|
| ATH (dried) | 40 | x | x | x |
| binder[1] | 26 | x | x | x |
| Disflamoll DPK | 26 | x | x | x |
| PTSI | 0.6 |  | x |  |
| Desmodur Z4370 | 1 |  |  | x |

-continued

| | amounts | test 7 | test 8 | test 9 |
|---|---|---|---|---|
| viscosity (mPa · s) | | | | |
| initial | | 115 | 115 | 119 |
| after 7 d/20° C. | | 223 | 132 | 160 |
| after 14 d/20° C. | | 381 | 157 | 254 |
| after 28 d/20° C. | | inhomogeneous greasy | 250 | inhomogeneous greasy |

[1]for binder see Example 1

In an isocyanate-group containing system the treatment of non-dewatered ATH with a water-scavenger (compound reactive with water) according to U.S. Pat. No. 4,876,291 is not sufficient and does not result in suitable storage stability (see tests 5 and 6).

ATH needs to be dewatered below 0.1% and additionally treated with a water scavenger, preferably with PTSI (see test 8) at elevated temperature.

Example 3

This example demonstrates the influence of drying of ATH and the use of an isocyanate compound as a treating agent on the storage stability of moisture-reactive PU-systems with a latent hardener.

After pretreatment of the premix (ATH and Disflamoll DPK) with Desmodur Z 4370 or IPDI at 70° C., the binder, latent hardener and additives were added.

| | amounts | test 10 | test 11 |
|---|---|---|---|
| Components | | | |
| ATH (not dried) | 40 | x | |
| ATH (dried) | 40 | | x |
| binder[1] | 26 | x | x |
| Disflamoll DPK | 26 | x | x |
| latent hardener BJ | 1.8 | x | x |
| salicylic acid* | 0 and 0.1 | x | x |
| Desmodur Z 4370 or IPDI | 0.5 | 0.5 | 0.5 |
| extrusion rate (g/min) | | | |
| after 7 d/20° C. | | 92 | 92 |
| after 28 d/20° C. | | 43 | 88 |
| after 3 months/20° C. | | greasy, inhomogeneous/ 15 | 40 |

*salicylic acid, up to an amount of 0.1 pbw does not show any influence

In a one-component PU-system with a latent hardener, ATH has to be dewatered below 0.1% and additionally pretreated with a moisture-reactive compound, e.g., Desmodur Z4370, at elevated temperatures of, e.g., 70° C.

A higher amount of Desmodur Z 4370 or IPDI (>0.5%) is not recommended because the mechanical properties may become inferior.

Example 4

This example demonstrates the Influence of the grain size of ATH on mechanical behaviour.

The mechanical properties were determined according to NF P 85 507. Aluminium was used as the substrate pretreated with SikaPrimer-215.

| ATH from Solem, F | modulus | elongation |
| --- | --- | --- |
| SB 632 (3.5 _m)* | 0.85 MPa | 220% C** |
| SB 434 (9 _m)* | 0.75 MPa | 110% C** |

*= average particle sizes
**= cohesive failure

A particle size of about 3.5 µm facilitates best performance in connection with modulus and elongation at break.

What is claimed is:

1. A one component polyurethane (PU) system comprising:
   a) at least one polyurethane prepolymer having isocyanate and/or silane terminal groups;
   b) at least one hydrated mineral which has been pre-dried prior to addition to the system and has a moisture content less than 0.1% by weight;
   c) at least one phosphorus-containing plasticizer; and
   d) at least one moisture-reactive compound comprising at least one water-reactive group and/or the reaction product thereof with water;
   wherein the molar sum of the water-reactive groups and/or the reaction products thereof with water does at most correspond to the at most 0.1% by weight of water in the hydrated mineral.

2. The PU system according to claim 1, wherein the moisture-reactive compound is selected from the group consisting of monomers having isocyanate groups, polyfunctional isocyanates, mono-isocyanates, anhydrides, silanes and titanates.

3. The PU-system according to claim 1, wherein the hydrated mineral is alumina trihydrate (ATH).

4. The PU system according to claim 2, wherein the moisture-reactive compound comprises paratoluene sulfonyl isocyanate.

5. The PU-system according to claim 1, wherein the phosphorus-containing plasticizer is halogen free.

6. The PU-system according to claim 5, wherein the phosphorus-containing plasticizer is diphenyl cresyl phosphate.

7. The PU-system according to claim 1, comprising:
   a) 10 to 60% by weight of said at least one hydrated mineral having a water-content of less than 0.1% by weight and treated with said at least one moisture-reactive compound,
   b) 10 to 50% by weight of said at least one phosphorus-containing plasticizer, and
   c) 10 to 40% by weight of said at least one polyurethane prepolymer.

8. The PU-system according to claim 7, comprising:
   a) 35 to 45% by weight of at least one of said hydrated minerals,
   b) 20 to 30% by weight of at least one of said phosphorus containing plasticizers,
   c) 20 to 30% by weight of at least one of said polyurethane prepolymer.

9. The PU-system according to claim 7, further comprising up to 10% by weight of at least one latent hardener wherein reactive groups of the hardener are present in an amount of 10-100% of the isocyanate and/or silane groups of the prepolymer.

10. The PU-system according to claim 9, comprising 1 to 3% by weight of at least one hardener.

11. The PU-system according to claim 9, wherein the reactive groups of the hardener are present in an amount of 40-90% of the isocyanate and/or silane groups of the prepolymer.

12. A PU-system according to claim 11, wherein the reactive groups of the curing agent are present in an amount of 50-60% of the isocyanate and/or silane groups.

13. The PU-system according to claim 7, wherein the polyurethane prepolymer has an isocyanate content referred to the total of the PU-system in the range of from 0.01 to 10% by weight.

14. A PU-system according to claim 13, wherein the isocyanate content is less than 1% by weight.

15. The PU-system according to claim 7, wherein the ratio of said phosphorus-containing plasticizer to said polyurethane prepolymer is about 1:1.

16. A method for producing a binder-containing one component PU-system according to claim 1, said method comprising, pre-drying at elevated temperatures the hydrated mineral to a water-content below 0.1% by weight, and adding said pre-dried mineral under water-free conditions to the prepolymer or composition comprising said prepolymer either together with or after, a said moisture-reactive compound comprising at least one water reactive group.

17. A method according to claim 16, wherein drying is carried out under vacuum.

* * * * *